(12) United States Patent
Kim

(10) Patent No.: US 10,629,914 B2
(45) Date of Patent: Apr. 21, 2020

(54) ELECTRODE ASSEMBLY AND METHOD FOR MANUFACTURING SAME

(71) Applicant: LG Chem, Ltd., Seoul (KR)

(72) Inventor: Hyuk-Su Kim, Daejeon (KR)

(*) Notice: Subject to any disclaimer, the term of this patent is extended or adjusted under 35 U.S.C. 154(b) by 75 days.

(21) Appl. No.: 15/752,472

(22) PCT Filed: Jan. 19, 2017

(86) PCT No.: PCT/KR2017/000687
§ 371 (c)(1),
(2) Date: Feb. 13, 2018

(87) PCT Pub. No.: WO2017/126918
PCT Pub. Date: Jul. 27, 2017

(65) Prior Publication Data
US 2019/0013524 A1    Jan. 10, 2019

(30) Foreign Application Priority Data

Jan. 19, 2016  (KR) .................. 10-2016-0006371

(51) Int. Cl.
*H01M 4/62* (2006.01)
*H01M 4/04* (2006.01)
(Continued)

(52) U.S. Cl.
CPC ......... *H01M 4/628* (2013.01); *H01M 4/0404* (2013.01); *H01M 4/0435* (2013.01);
(Continued)

(58) Field of Classification Search
None
See application file for complete search history.

(56) References Cited

U.S. PATENT DOCUMENTS

2006/0127773 A1   6/2006   Kawakami et al.
2010/0075225 A1   3/2010   Wilkins et al.
(Continued)

FOREIGN PATENT DOCUMENTS

JP   2005340109 A   12/2005
JP   2006286427 A   10/2006
(Continued)

OTHER PUBLICATIONS

Extended European Search Report for Application No. EP17741684.9 dated May 30, 2018.
(Continued)

*Primary Examiner* — Maria Laios
*Assistant Examiner* — Angela J Martin
(74) *Attorney, Agent, or Firm* — Lerner, David, Littenberg, Krumholz & Mentlik, LLP

(57) ABSTRACT

The present disclosure is directed to preventing generation of side reactions at a negative electrode, inhibiting an increase in resistance, and improving productivity. An electrode assembly is provided including: a negative electrode including a negative electrode current collector having a negative electrode tab at one end, and a negative electrode active material layer formed on a surface thereof; a positive electrode including a positive electrode current collector having a positive electrode tab at one end, and a positive electrode active material layer formed on a surface thereof; and a separator interposed between the positive and negative electrodes, and including a coating layer containing a conductive material and a polymer binder on the top surface of the negative electrode active material layer, wherein the coating layer is spaced apart from the top end, where the negative electrode tab is formed, and the bottom end by a predetermined distance.

8 Claims, 2 Drawing Sheets

(51) Int. Cl.
*H01M 4/36* (2006.01)
*H01M 10/05* (2010.01)
*H01M 10/42* (2006.01)
*H01M 10/0525* (2010.01)
*H01M 10/052* (2010.01)
*H01M 10/058* (2010.01)
*H01M 4/02* (2006.01)

(52) U.S. Cl.
CPC ......... *H01M 4/366* (2013.01); *H01M 10/052* (2013.01); *H01M 10/058* (2013.01); *H01M 10/0525* (2013.01); *H01M 10/4235* (2013.01); *H01M 2004/027* (2013.01); *H01M 2220/30* (2013.01); *Y02T 10/7011* (2013.01)

(56) References Cited

U.S. PATENT DOCUMENTS

2013/0309571 A1* 11/2013 Yoon ..................... H01M 4/583
429/213

2015/0086868 A1  3/2015  Inoue et al.

FOREIGN PATENT DOCUMENTS

| | | |
|---|---|---|
| JP | 2007165061 A | 6/2007 |
| JP | 2009283452 A | 12/2009 |
| JP | 201377398 A | 4/2013 |
| JP | 201564975 A | 4/2015 |
| JP | 201597199 A | 5/2015 |
| JP | 2015520926 A | 7/2015 |
| KR | 100659860 B1 | 12/2006 |
| KR | 20090035659 A | 4/2009 |
| KR | 20100043727 A | 4/2010 |
| KR | 20120000708 A | 1/2012 |
| KR | 20150034944 A | 4/2015 |

OTHER PUBLICATIONS

Search report from International Application No. PCT/KR2017/000687, dated Jun. 1, 2017.

* cited by examiner

ELECTRODE ASSEMBLY AND METHOD FOR MANUFACTURING SAME

CROSS-REFERENCE TO RELATED APPLICATIONS

The present application is a national phase entry under 35 U.S.C. § 371 of International Application No. PCT/KR2017/000687, filed on Jan. 19, 2017 which claims priority to Korean Patent Application No. 10-2016-0006371, filed on Jan. 19, 2016 in the Republic of Korea, the disclosures of which are incorporated herein by reference.

TECHNICAL FIELD

The present disclosure relates to an electrode assembly and a method for manufacturing the same.

BACKGROUND ART

Recently, energy storage technology has been given increasing attentions. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused.

Among the commercially available secondary batteries, lithium secondary batteries developed in the early 1990's have been spotlighted, since they have a higher driving voltage and significantly higher energy density as compared to conventional batteries, such as Ni-MH batteries, N—Cd batteries and sulfuric acid-lead batteries using an aqueous electrolyte.

In addition, such lithium secondary batteries have been manufactured to have a large surface area for the purpose of realizing high capacity and high density. To improve electroconductivity, a conductive material has been added to an electrode active material. However, there have been problems in that such a conductive material cannot be dispersed homogeneously or side reactions occur after using batteries repeatedly. To solve the above-mentioned problems, it has been suggested that a conductive material coating layer is formed on at least one surface of a negative electrode, where side reactions mainly occur, to inhibit generation of side reactions. However, there has been a problem in that the thickness of an electrode assembly is increased due to such a conductive material coating layer, resulting in an increase in resistance.

To form such a conductive material coating layer, the following two methods have been used frequently: a method applying and drying slurry containing a negative electrode active material to one surface of a negative electrode current collector and further applying slurry for forming a conductive material coating layer (also referred to as conductive material slurry hereinafter); and a method applying conductive material slurry to negative electrode active material slurry while carrying out a drying step at the same time.

However, the above-mentioned methods are problematic in that the two-step process requires carrying out coating steps twice and thus causes degradation of productivity and the preliminarily coated negative electrode active material is separated during a conveying process for the subsequent conductive material coating step, while the process of applying conductive material slurry at the same time causes mixing of the negative electrode active material slurry with the conductive material slurry so that the conductive material coating layer may not be controlled.

DISCLOSURE

Technical Problem

The present disclosure is designed to solve the problems of the related art, and therefore the present disclosure is directed to providing an electrode assembly which minimizes an increase in thickness of an electrode assembly and inhibits side reactions at an electrode.

The present disclosure is also directed to providing a method for manufacturing an electrode assembly which causes no separation of a negative electrode active material, facilitates control of a conductive material coating layer and provides improved productivity.

Technical Solution

To solve the above-mentioned problems, the present disclosure provides an electrode assembly and a method for manufacturing the same. According to a first embodiment of the present disclosure, there is provided an electrode assembly including: a negative electrode including a negative electrode current collector provided with a negative electrode tab at one end thereof, and a negative electrode active material layer formed on at least one surface of the negative electrode current collector; a positive electrode including a positive electrode current collector provided with a positive electrode tab at one end thereof, and a positive electrode active material layer formed on at least one surface of the positive electrode current collector; and a separator interposed between the positive electrode and the negative electrode, and further including a conductive material coating layer containing a conductive material and a polymer binder and provided on the top surface of the negative electrode active material layer, wherein the conductive material coating layer is spaced apart from each of the top end, where the negative electrode tab is formed, and the bottom end by a predetermined distance.

According to a second embodiment, there is provided the electrode assembly of the first embodiment, wherein the conductive material coating layer is formed to be spaced apart from both ends by a predetermined distance.

According to a third embodiment, there is provided the electrode assembly of the first or the second embodiment, wherein the predetermined distance is 5-10% of the width of the negative electrode current collector.

According to a fourth embodiment, there is provided the electrode assembly of any one the first to the third embodiments, wherein the conductive material coating layer has a thickness of 1-5 µm.

According to a fifth embodiment, there is provided the electrode assembly of any one the first to the fourth embodiments, wherein the conductive material coating layer further includes a dispersant.

In another aspect of the present disclosure, there is also provided a method for manufacturing the electrode assembly. According to a sixth embodiment, there is provided a method for manufacturing an electrode assembly, including the steps of: (S100) preparing a negative electrode, a positive electrode and a separator; (S200) applying conductive material slurry to the surface of the negative electrode; (S300) stacking the positive electrode, the negative electrode and the separator in such a manner that the separator may be interposed between the negative electrode and the positive electrode to prepare a stacked structure; and (S400) carrying out lamination of the stacked structure to obtain an electrode assembly.

According to a seventh embodiment, there is provided the method for manufacturing an electrode assembly of the sixth embodiment, wherein the conductive material slurry is applied while being spaced apart from each of the top end and the bottom end of the negative electrode current collector by a predetermined distance.

According to an eighth embodiment, there is provided the method for manufacturing an electrode assembly of the sixth or the seventh embodiment, wherein the lamination is carried out at a temperature of 50-150° C. under a pressure of 1-10 kgf/cm$^2$.

Advantageous Effects

The electrode assembly provided with a conductive material coating layer according to the present disclosure can inhibit side reactions at an electrode, while minimizing an increase in thickness.

In addition, according to the method of the present disclosure, separation of a negative electrode active material does not occur during the manufacture of an electrode assembly including a negative electrode provided with a conductive material coating layer, the conductive material coating layer can be controlled with ease, and the productivity of an electrode assembly can be improved by virtue of a simplified process.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing. Meanwhile, the shapes, sizes, scales or proportions of some elements in the drawings may be exaggerated for the purpose of clearer description.

BEST MODE

Figure 1A:
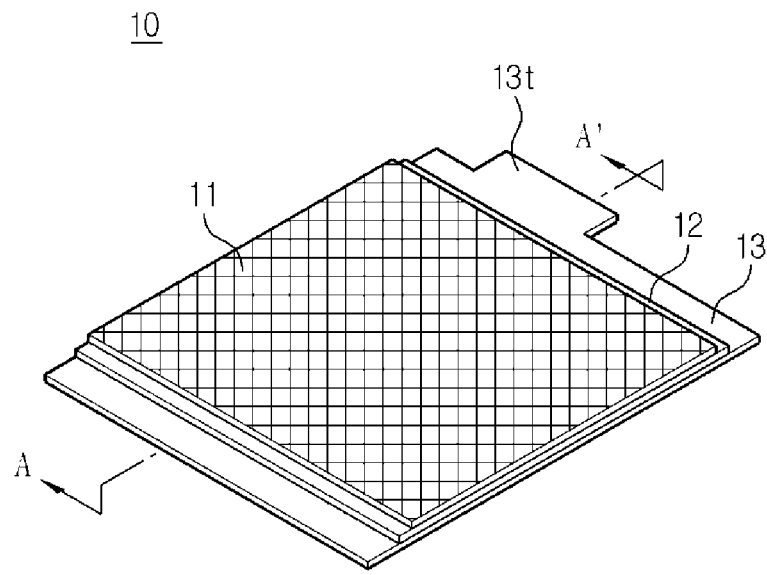
FIG. 1a and FIG. 1b are schematic views illustrating the negative electrode provided with a conductive material coating layer according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the conventional lithium secondary battery, lithium ions are transported to the surface of a negative electrode through an electrolyte and diffused into the electrode and into the negative electrode active material. When highly reactive lithium ions are excessive, side reactions occur so that the adjacent electrolyte may cause reductive decomposition to produce byproducts. A method for providing one surface of a negative electrode with a conductive material coating layer has been suggested in order to inhibit such side reactions at the negative electrode and to impart conductivity. However, the presence of the conductive material coating layer causes an increase in overall thickness of an electrode assembly and the conductive material coating layer functions as resistance to cause an increase in overall resistance of the battery undesirably.

The present disclosure is focused on the fact that side reactions occur largely at the central portion of a negative electrode due to relatively high current density and a possibility of generating a gas trap. Thus, according to the present disclosure, a conductive material coating layer is formed merely on the central portion of the negative electrode so that an increase in thickness of the electrode assembly may be minimized and side reactions occurring at the negative electrode may be inhibited.

In one aspect, there is provided an electrode assembly including a negative electrode, a positive electrode and a separator interposed between the negative electrode and the positive electrode. Herein, the negative electrode includes a negative electrode current collector and a negative electrode active material layer formed on at least one surface of the negative electrode current collector. In addition, the positive electrode includes a positive electrode current collector and a positive electrode active material layer formed on at least one surface of the positive electrode current collector. Herein, the negative electrode current collector and the positive electrode current collector are provided with a negative electrode tab and a positive electrode tab, respectively, at one end of each current collector. Herein, the negative electrode is further provided with a conductive material coating layer containing a conductive material and a polymer binder on the surface of the negative electrode, i.e., on the surface of the negative electrode active material layer. Herein, the conductive material coating layer is formed so that it may be spaced apart from the negative electrode tab by a predetermined distance and thus may not be overlapped with the negative electrode tab, when viewed from the plane (top view) of the negative electrode. The negative electrode according to the present disclosure is provided with a conductive material coating layer at the central portion thereof, where side reactions occur largely, and thus can minimize an increase in resistance caused by the conductive material coating layer.

Figure 1B:
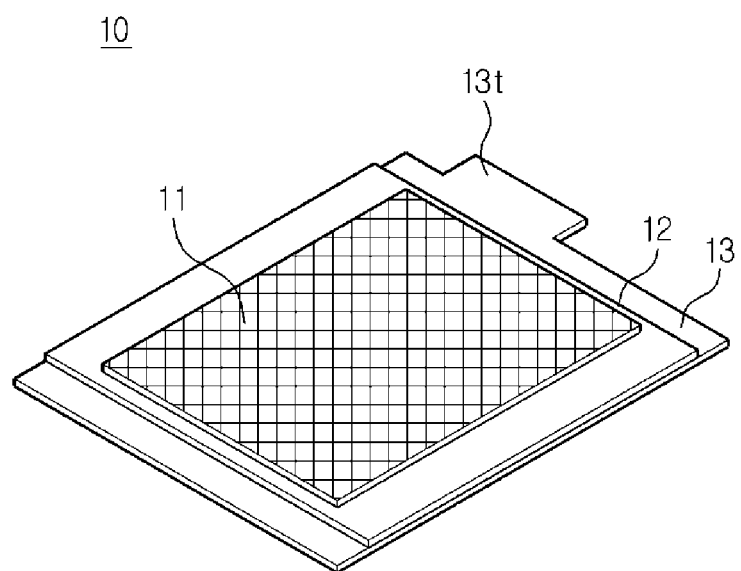

FIG. 1a and FIG. 1b are schematic views illustrating the negative electrode provided with a conductive material coating layer according to an embodiment of the present disclosure. Referring to FIG. 1a, the conductive material coating layer 11 may be formed to be spaced from each of the top end and bottom end of the negative electrode 10. As used herein, the top end means the end of the current collector, where a tab is formed, in the negative electrode, and the bottom end means the edge portion opposite to the top end. In addition, referring to FIG. 1b, the conductive material coating layer 11 may be spaced from the rim of the negative electrode 10 by a predetermined distance. In this case, by discontinuously applying conductive material slurry, the conductive material coating layer 11 may be formed merely at the central portion of the negative electrode plane. According to an embodiment of the present disclosure, the distance is 5-10% of the width of the current collector. For example, the distance may be 0.5-50 mm, 1-50 mm, or 5-50 mm.

Figure 1C:
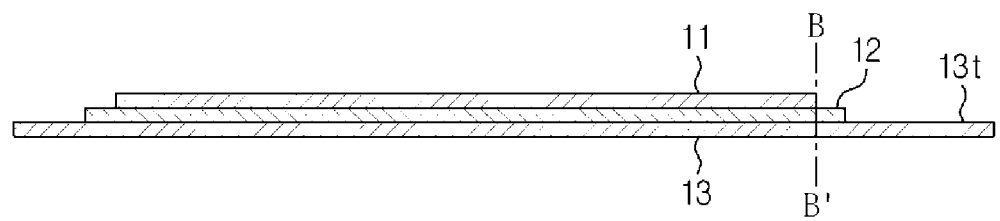
FIG. 1c is a schematic view illustrating the sectional surface of the negative electrode provided with a conductive material coating layer according to an embodiment of the present disclosure.

FIG. 1c shows the section of the negative electrode taken along line A-A' of FIG. 1a. Referring to FIG. 1c, the end of the conductive material coating layer is not overlapped with that of the tab but both ends are spaced apart from each other. As shown in FIG. 1c, the line segment B-B' taken from one edge of the conductive material coating layer that is the nearest from the tab to the negative electrode plane does not pass through the tab of the current collector.

According to an embodiment of the present disclosure, the conductive material coating layer may have a thickness of 1-50 μm.

According to an embodiment of the present disclosure, the conductive material is not particularly limited, as long as it is an electroconductive material causing no chemical change in an electrochemical device. In general, carbon black, graphite, carbon fibers, carbon nanotubes, metal powder, conductive metal oxides, organic conductive materials, etc. may be used. Commercially available products of conductive materials include acetylene black (available from Chevron Chemical Company, Gulf Oil Company, etc.), ketjen Black EC (available from Armak Company), Vulcan XC-72 (available from Cabot Company), Super P (available from MMM Company), or the like. Particular examples of conductive materials include acetylene black, carbon black, graphite, or the like.

According to an embodiment of the present disclosure, the polymer binder may be any one selected from the group consisting of polyvinylidene fluoride (PVDF), hexafluoro propylene (HFP), polyvinylidene fluoride-co-hexafluoro propylene, polyvinylidene fluoride-co-trichloroethylene, polymethyl methacrylate, polybutyl acrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethyl polyvinylalcohol, cyanoethyl cellulose, cyanoethyl sucrose, pullulan, carboxymethyl cellulose, acrylonitrile-styrene-butadiene copolymer and polyimide, or a combination of two or more of them.

According to an embodiment of the present disclosure, the conductive material coating layer may further include a dispersant so that the conductive material may be dispersed homogeneously to form a conductive network well.

The positive electrode current collector is not particularly limited, as long as it has high conductivity while not causing any chemical change in a battery. Particular examples of the positive electrode current collector may include stainless steel, aluminum, nickel, titanium, baked carbon, or aluminum or stainless steel surface-treated with carbon, nickel, titanium or silver, or the like.

The positive electrode active material may be a lithium-containing oxide, and a lithium-containing transition metal oxide may be used preferably. Particular examples of the lithium-containing transition metal oxide may be any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3) and $Li_xFePO_4$ (0.5<x<1.3), or a combination of two or more of them. The lithium-containing transition metal oxide may be coated with a metal, such as aluminum (Al) or metal oxide. Besides such lithium-containing transition metal oxides, sulfides, selenides and halides may also be used.

The positive electrode active material layer may be formed by applying slurry containing a positive electrode active material to one surface of a positive electrode current collector, followed by drying and rolling.

The negative electrode includes a negative electrode current collector and a negative electrode active material layer formed on at least one surface of the negative electrode current collector.

The negative electrode current collector is not particularly limited, as long as it has conductivity while not causing any chemical change in a battery. Particular examples of the negative electrode current collector may include copper, stainless steel, aluminum, nickel, titanium, baked carbon, copper or stainless steel surface-treated with carbon, nickel, titanium or silver, aluminum-cadmium alloy, or the like.

The negative electrode active material is capable of lithium ion intercalation/deintercalation and particular examples thereof include lithium metal, a carbonaceous material, metal oxide, and a combination thereof.

Particularly, low crystalline carbon and high crystalline carbon may be used as carbonaceous material. Typical examples of low crystalline carbon include soft carbon and hard carbon. Typical examples of high crystalline carbon include Kish graphite, pyrolytic carbon, mesophase pitch based carbon fibers, meso-carbon microbeads, mesophase pitches, and high-temperature baked carbon, such as petroleum or coal tar pitch-derived cokes.

Particular examples of the metal oxide include compounds containing at least one metal element, such as Si, Ge, Sn, Pb, P, Sb, Bi, Al, Ga, In, Ti, Mn, Fe, Co, Ni, Cu, Zn, Ag, Mg, Sr and Ba. Although such metal oxides may be used in any one of the forms, including simple substance, alloy, oxides ($TiO_2$, $SnO_2$, etc.), nitride, sulfide, boride and alloy with lithium, simple substance, oxides and alloy with lithium may have high capacity. Particularly, metal compounds which contain at least one element selected from Si and Sn and may contain at least one element selected from Si, Ge and Gn can provide a battery with higher capacity.

The negative electrode active material layer may be formed by applying slurry containing a negative electrode active material to one surface of a negative electrode current collector, followed by drying and rolling.

The separator may include a porous film and/or nonwoven web including a polymer material. In addition, the polymer material may include any one selected from the group consisting of polyolefinic polymer resins, polyethylene terephthalate, polybutylene terephthalate, polyester, polyacetal, polyamide, polycarbonate, polyimide, polyetheretherketone, polyethersulfone, polyphenylene oxide, polyphenylene sulfide and polyethylene naphthalene, or a combination of two or more of them.

In addition, the separator may have a pore diameter of 0.01-10 μm and a thickness of 5-300 μm.

In another aspect, there is provided a method for manufacturing the above-described electrode assembly. The method includes the following steps (S100) to (S400):

(S100) preparing a negative electrode, a positive electrode and a separator;

(S200) applying conductive material slurry to the surface of the negative electrode;

(S300) stacking the positive electrode, the negative electrode and the separator in such a manner that the separator may be interposed between the negative electrode and the positive electrode to prepare a stacked structure; and (S400) carrying out lamination of the stacked structure to obtain an electrode assembly.

According to an embodiment of the present disclosure, the conductive material slurry is liquid slurry including a conductive material and a polymer dispersed in a dispersion medium.

Meanwhile, according to an embodiment of the present disclosure, the negative electrode and/or the positive electrode may be prepared by the method including the following steps of:

(S110) preparing electrode active material layer slurry;

(S120) applying the slurry to at least one surface of an electrode current collector;

(S130) drying the slurry; and (S140) rolling the electrode active material layer dried in step (S130).

Step (140) may be carried out any one selected from room-temperature rolling, hot rolling and cold rolling, or a combination of two or more of the above-mentioned rolling processes.

According to the present disclosure, the lamination process is carried out after the separator is interposed between the negative electrode and the positive electrode to form a stacked structure. After the stacked structure is laminated, an electrode assembly is obtained. According to an embodiment of the present disclosure, the stacked structure may have an arrangement of separator/negative electrode/separator/positive electrode. The lamination process is intended to adhere an electrode with a separator. When an electrode is adhered excessively with a separator, the wettability of the electrode and separator is degraded, resulting in degradation of air permeability of the separator. When an electrode is adhered weakly with a separator, the resultant secondary battery may have increased resistance and the processability may be degraded. Therefore, it is preferred to maintain adhesion force at suitable temperature under adequate pressure to improve the interfacial characteristics between an electrode and a separator. In this context, the lamination is carried out preferably at a temperature of 50-150° C. under a pressure of 1-10 kgf/cm$^2$.

As described above, the polymer binder contained in the conductive material slurry functions as adhesive by the pressure and heat during the lamination process, and thus any additional adhesive layer may not be required or the content of polymer binder in the negative electrode active material layer may be reduced.

According to an embodiment of the present disclosure, the method for assembling the electrode assembly may be carried out through a continuous process including the step of providing a negative electrode, a positive electrode and a separator and the lamination process. Such a continuous process may be carried out by the method including the steps of: (S210) unwinding a negative electrode roll on which a negative electrode having negative electrode active materials on both surfaces of a negative electrode current collector is wound; (S220) applying conductive material slurry to the surface of the negative electrode; (S230) unwinding a positive electrode roll on which a positive electrode having positive electrode active material layers on both surfaces of a positive electrode current collector is wound and unwinding a separator roll on which a separator material is wound;

(S240) carrying out stacking so that the separator may be interposed between the negative electrode and the positive electrode to prepare a stacked structure including the negative electrode, positive electrode and the separator stacked successively; (S250) introducing the stacked structure into a lamination unit; and (S260) carrying out lamination of the stacked structure to obtain an electrode assembly.

As described above, according to the present disclosure, the conductive material slurry is applied to the negative electrode active material layer right before the lamination step for stacking and pressurizing the electrodes and separator is carried out.

According to the related art, an electrode provided with a conductive material coating layer is obtained by applying slurry containing a negative electrode active material to one surface of a negative electrode current collector, followed by drying and rolling, to provide an electrode, and then applying slurry for forming a conductive material coating layer to the surface of the electrode and further carrying out drying. The obtained electrode is introduced to a lamination step to form an electrode assembly. In this case, coating steps are carried out twice to form the conductive material coating layer. When an electrode assembly is manufactured by the above-mentioned method, a step of supplying electrodes and a separator from each of unwinding units thereof, a step of stacking the electrodes and separator to form a stacked structure, and a step of introducing the stacked structure to a lamination step are carried out continuously. When the conductive material coating layer is formed through such a continuous process, it is required that the electrode is subjected to an additional step of applying conductive material slurry to the electrode surface and carrying out drying, before the lamination step. Thus, the electrode runs through an increased processing route, the overall process is delayed, and the production efficiency is degraded. Moreover, such a delayed process may cause separation of the active material from the electrode layer.

Meanwhile, it may be considered that conductive material slurry is applied right after applying electrode slurry and then drying the electrode active material layer and the conductive material coating layer at the same time in order to reduce the processing time of the method for manufacturing an electrode. However, in this case, the electrode slurry may be mixed with the conductive material slurry before the electrode layer and the conductive material coating layer are solidified, thereby making it difficult for the conductive material coating layer to be disposed uniformly on the surface of the electrode layer.

In the method for forming a conductive material coating layer according to the present disclosure, the conductive material slurry is applied to the electrode surface, before the lamination step is carried out after forming the electrode. Therefore, mixing between the conductive material coating layer and the electrode active material layer is prevented. In addition, the conductive material coating layer is dried during the lamination step to reduce the time required for the overall process. It is required to add only a unit for applying the conductive material coating layer. There is no need for providing a separate unit for drying the slurry for forming a conductive material coating layer. In addition, since the conductive material slurry is applied to a preliminarily pressurized electrode, it is easy to control the content of conductive material in the conductive material coating layer. Meanwhile, the surface of the pressurized electrode has excessively low surface roughness and thus shows low adhesion to a separator. However, when the conductive material slurry is applied in the lamination step as described herein, it is possible to expect an anchor effect derived from the slurry. In addition, it is possible to expect improvement of adhesion derived from the binder contained in the conductive material slurry, even when any separate adhesive layer is not formed.

According to the present disclosure, electrode rolls, on which electrodes provided with electrode active material layers are wound, and a separator roll are unwound and introduced to a lamination unit, so that conductive material slurry may be applied to one surface of a negative electrode before carrying out a lamination step. Thus, there is no need for a separate coating step. As a result, separation of a negative active material caused by a conveying process does not occur, the productivity can be improved, and the conductive material coating layer can be controlled with ease. In addition, the polymer binder contained in the conductive material slurry serves as adhesive during the lamination process. Therefore, any separate adhesive layer is not required and the content of polymer binder in the negative electrode active material layer can be reduced.

Figure 2:
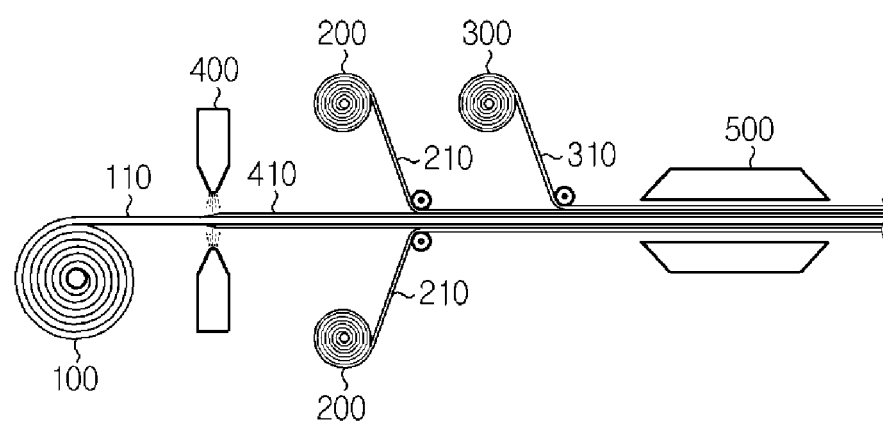
FIG. 2 is a schematic flow chart illustrating the process for manufacturing an electrode assembly according to an embodiment of the present disclosure.

FIG. 2 is a schematic view illustrating the method for manufacturing an electrode assembly according to an embodiment of the present disclosure. Referring to FIG. 2, conductive material slurry 410 is applied to both surfaces of a negative electrode unwound from a negative electrode roll 100 by using a conductive material coating unit 400, and a positive electrode 210 and a separator 310 unwound from a positive electrode roll 200 and a separator roll 300, respectively, are arranged to a structure of separator/negative electrode/separator/positive electrode. Then, the structure is introduced into a lamination unit 500 to obtain an electrode assembly.

The conductive material slurry is applied while being spaced apart from each of the top end and the bottom end of the negative electrode current collector by a predetermined distance, or applied discontinuously, so that a conductive material coating layer may be formed at the central portion of the negative electrode.

The conductive material slurry may be applied by using a spray coating process, printing process, etc., but is not limited thereto. In addition, it is preferred to apply the conductive material slurry by using a nozzle so that it may be applied to a small thickness.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

DESCRIPTION OF DRAWING NUMERALS

10: Negative electrode
11: Conductive material coating layer
12: Negative electrode active material layer
13: Current collector
13t: Electrode tab
100: Negative electrode roll
110: Negative electrode
200: Positive electrode roll
210: Positive electrode
300: Separator roll
310: Separator
400: Conductive material coating unit
410: Slurry for forming conductive material coating layer
500: Lamination unit

What is claimed is:

1. An electrode assembly, comprising; a
a negative electrode;
a positive electrode; and
a separator interposed between the negative electrode and the positive electrode,
wherein the negative electrode comprises:
a negative electrode current collector having a top end, the top end having a negative electrode tab extending therefrom, and a bottom end; and
a negative electrode active material layer disposed on at least one surface of the negative electrode current collector; and
a conductive material coating disposed on the surface of the negative electrode active material layer,
wherein the conductive material coating layer comprises a conductive material and a polymer binder, and
wherein the conductive material coating layer is spaced apart from the top end by a first predetermined distance such that the conductive material coating layer does not overlap with the negative electrode tab, and
wherein the conductive material coating layer is spaced apart from the bottom end of the negative electrode current collector such that the conductive material coating layer does not overlap with the bottom end of the negative electrode current collector,
where the negative electrode active material layer having a first end in the direction of the top end of the current collector and a second end in the direction of the bottom end of the current collector, wherein the conductive material coating layer is spaced apart from the first and second ends of the electrode active material layer by a second predetermined distance such that the conductive material layer does not overlap with the first and second ends of the electrode active material layer.

2. The electrode assembly according to claim 1, wherein the first predetermined distance is 5-10% of the width of the negative electrode current collector.

3. The electrode assembly according to claim 1, wherein the conductive material coating layer has a thickness of 1-5 μm.

4. The electrode assembly according to claim 1, wherein the conductive material coating layer further comprises a dispersant.

5. The electrode assembly according to claim 1, wherein the conductive material coating layer is disposed on the surface of the negative electrode active material layer such that portions of the surface of the negative electrode active material layer are not covered by the conductive material coating layer.

6. A method for manufacturing an electrode assembly, comprising:
applying conductive material slurry to the surface of a negative electrode active material layer, the negative electrode active material layer disposed on a negative current collector, the negative current collector having a top end, a negative electrode current collector having a top end, the top end having a negative electrode tab extending therefrom, and a bottom end;
stacking a positive electrode, the negative electrode and a separator in such that the separator is interposed between the negative electrode and the positive electrode to prepare a stacked structure; and
laminating the stacked structure to obtain an electrode assembly, wherein the conductive material slurry is dried during the lamination of the stacked structure to form a conductive material layer, and the conductive material layer is spaced apart from each of the top end and the bottom end of the negative electrode current collector by a predetermined distance such that the conductive material coating layer does not overlap with the negative electrode tab, and wherein the conductive material coating layer is spaced apart from the bottom end of the negative electrode current collector such that the conductive material coating layer does not overlap with the bottom end of the negative electrode current collector, and wherein the negative electrode active material layer having a first end in the direction of the top end of the current collector and a second end in the direction of the bottom end of the current collector, wherein the conductive material coating layer is spaced apart from the first and second ends of the electrode active material layer by a second predetermined distance such that the conductive material layer does not overlap with the first and second ends of the electrode active material layer.

7. The method for manufacturing an electrode assembly according to claim 6, wherein the laminating step is performed at a temperature of 50-150° C. under a pressure of 1-10 kgf/cm².

8. The method according to claim 6, wherein conductive material coating layer is disposed on the surface of the negative electrode active material layer such that portions of the surface of the negative electrode active material layer are not covered by the conductive material coating layer.

* * * * *